United States Patent [19]

Kashimoto et al.

[11] Patent Number: 5,051,701

[45] Date of Patent: Sep. 24, 1991

[54] PYROELECTRIC SENSING APPARATUS SUBSTANTIALLY INDEPENDENT OF NOISE OUTPUT CAUSED BY MECHANICAL SHOCK OR ELECTRICAL SHOCK

[75] Inventors: Takashi Kashimoto, Nara; Koji Yoshino, Souraku; Kimiaki Yamaguchi; Isao Kasai, both of Nara, all of Japan

[73] Assignee: Matsushita Electric Industrial Co., Ltd., Kadoma, Japan

[21] Appl. No.: 429,286

[22] Filed: Oct. 31, 1989

[30] Foreign Application Priority Data

Oct. 31, 1988 [JP] Japan .................... 63-274836

[51] Int. Cl.$^5$ .................. G01K 7/00; H03K 5/22; H01L 31/00; H05B 1/02
[52] U.S. Cl. .................... 328/3; 307/310; 307/234; 307/516; 328/111; 219/494
[58] Field of Search ............... 328/3, 34, 111; 307/310, 491, 494, 234, 516; 219/492, 494

[56] References Cited

U.S. PATENT DOCUMENTS 3,268,453 8/1966 Ouchi et al. .................. 252/62.9
4,401,884 8/1983 Kusunoki et al. .............. 219/492

Primary Examiner—Stanley D. Miller
Assistant Examiner—Trong Phan
Attorney, Agent, or Firm—Cushman, Darby & Cushman

[57] ABSTRACT

A pyroelectric sensing apparatus is provided with an A/D convertor 29, whose digital output is examined whether continuation time period of the output from the pyroelectric element is longer than a predetermined reference time period such as 500 m sec; thereby maloperation due to noise output from the pyroelectric element generated by mechanical shock (door close) or electric shock (pulling out a plug of other apparatus) is eliminated.

4 Claims, 10 Drawing Sheets

FIG.1 (General Art)
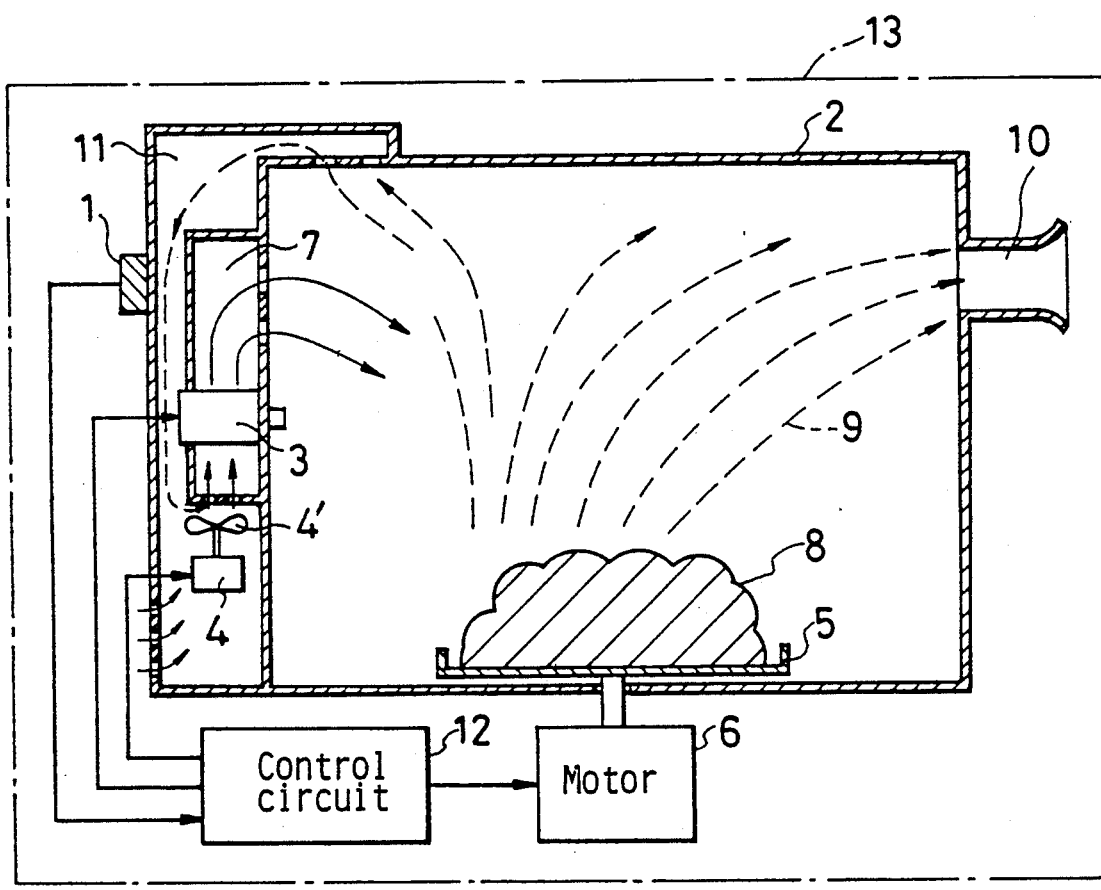

FIG.2 (a)(General Art)
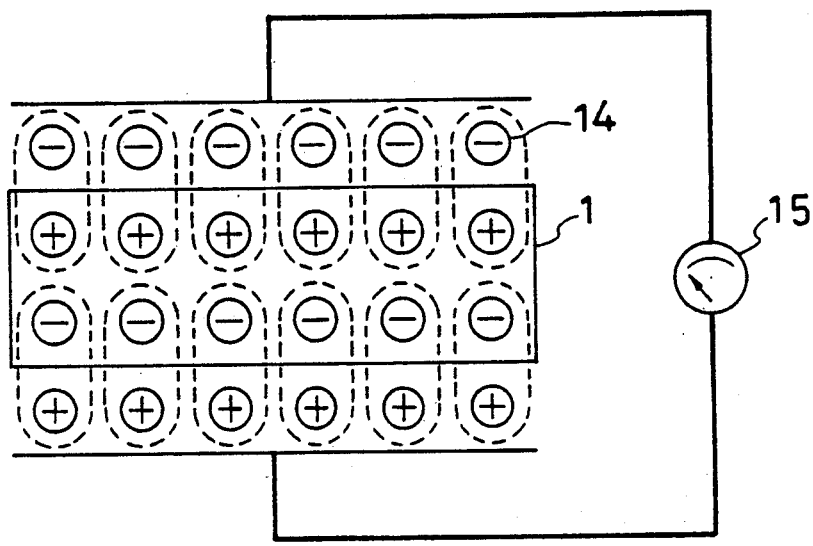
Temperature T°C
FIG.2 (b)(General Art)
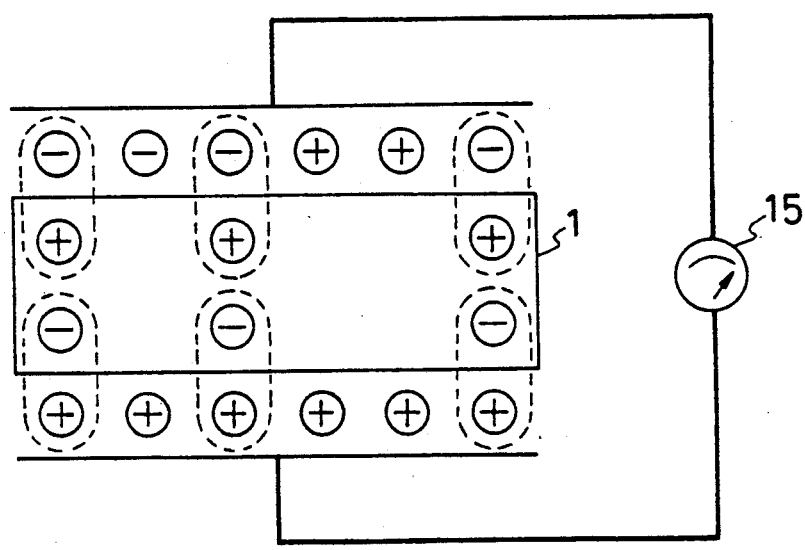
Immediately after rise of temperature to (T + ΔT)°C FIG. 3 (General Art)
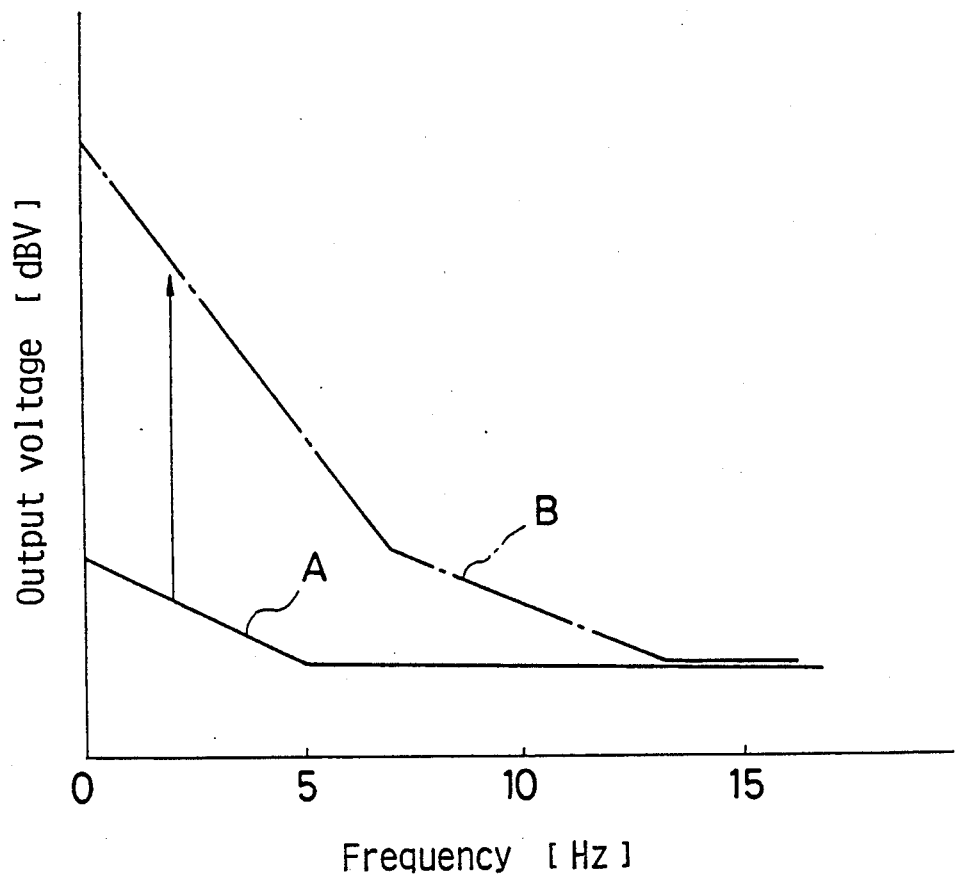

FIG. 9
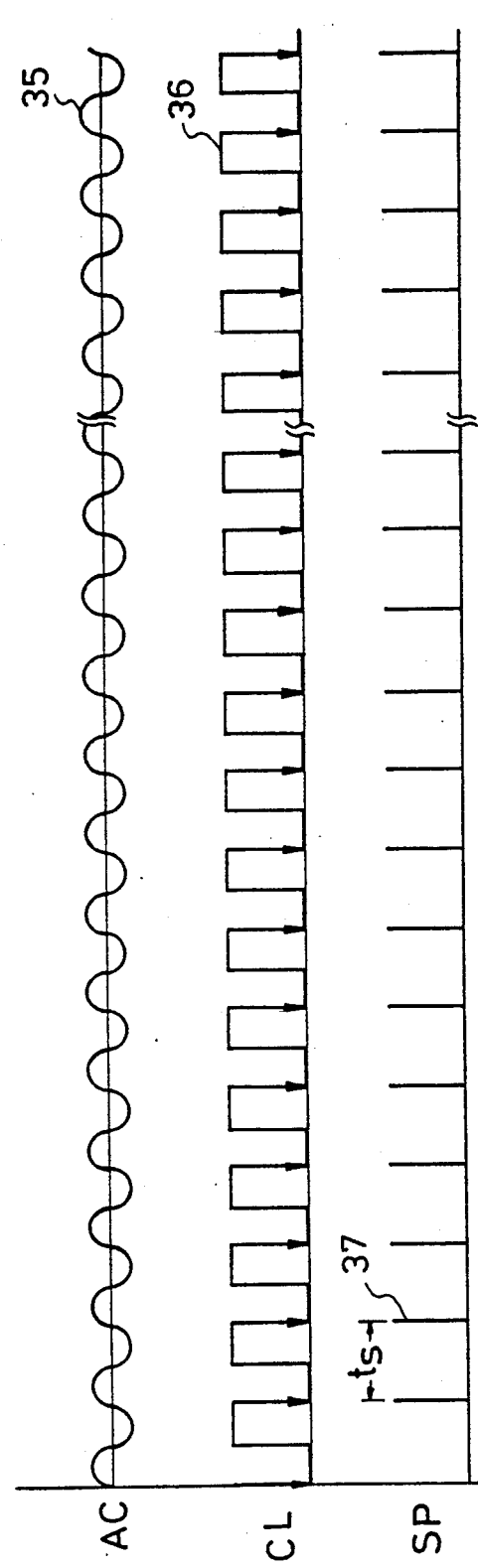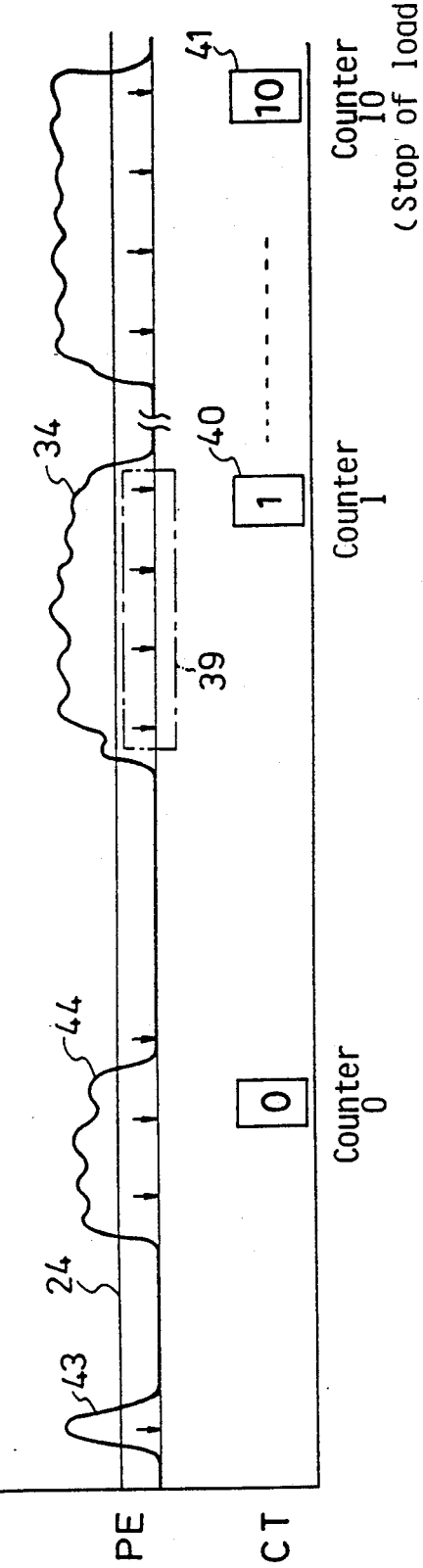

PYROELECTRIC SENSING APPARATUS SUBSTANTIALLY INDEPENDENT OF NOISE OUTPUT CAUSED BY MECHANICAL SHOCK OR ELECTRICAL SHOCK

FIELD OF THE INVENTION AND RELATED ART STATEMENT

1. Field of the Invention

The present invention relates to an improvement in a pyroelectric sensing apparatus which is for sensing a hot steam stream by using a pyroelectric element.

2. Description of the Related Art

Hitherto, the signal detection circuits of a pyroelectric element has been configured, for instance as shown in FIG. 1. FIG. 1 shows an example of a known microwave oven wherein the pyroelectric element is used in a circuit to re-heat a food stuff 8 in the microwave oven. FIG. 1 is a sectional schematic view showing the configuration of the microwave oven, wherein in an metal casing 13 of the microwave oven, a magnetron 3 is mounted on a heating chamber 2. The heating chamber 2 has therein a rotary table 5 for receiving an object food stuff 8 and is to be rotated by a motor 6. A blower 4' which is driven by a blower motor 4 is provided to blow air for cooling the magnetron 3, and the air heated by the magnetron is led into the heating chamber 2 so as to effectively heat the surface of the food stuff 8. Steam from the heated food stuff 8 is discharged through an exhaust pipe 10 to the outside, and a small part of the steam is inhaled through an inhale duct 11 by the function of the blower 4'. The inhale duct 11 has a pyroelectric element 1 therein, so that the part of the steam in the inhaled air touch the active surface of a pyroelectric element 1 mounted on the inhale duct 11. The pyroelectric element 1 has a ferroelectric thin ceramic material on a metal plate, so that its surface electric polarization is changed by local thermal change by the hot steam flow on its surface.

FIG. 2(a) and FIG. 2(b) elucidate the principle of detection of steam by the pyroelectric element 1. The pyroelectric element 1 is made by polarizing a thin ferroelectric film having plumbium titanate and zirconia, or the like ceramic as host material, provided on a metal plate and treated in a strong electric field to make polarization. In a stable state where no steam comes and the sensing face of the pyroelectric element is at room temperature (T °C.), as shown in FIG. 2(a) no current flows through an ammeter 15, because the charges on the polarized surface and the stray charges 14 in the air are making electric neutralization. When a hot steam from the food stuff comes and contacts with a sensing face of the pyroelectric element 1, the hot steam gives iterative local thermal changes $\Delta T$ °C. to the sensing face of the pyroelectric element, as shown in FIG. 2(b). The sensing face of pyroelectric element 1 can not follow such rapid local temperature changes, and therefore the surface of the element makes imbalance of the electric charges, thereby producing pulse train current. The current is detected by the ammeter, and the current is called the pyroelectric current.

Referring to FIG. 3, examination of the frequency components of the pulse currents generated by the pyroelectric sensor shows that a 40 dB signal change is generated in a low frequency region (0-4 Hz band) when boiling steam touches the sensor. Line A of FIG. 3 shows the sensor output under normal conditions, whereas line B shows the output voltage when the sensor is contacted by steam.

In the conventional circuitry configuration of the pyroelectric sensing apparatus as shown in FIG. 4 for detecting the signal of the pyroelectric element 1, a parallel load resistor 16 is connected across both ends of the pyroelectric sensor 1, and through a coupling circuit consisting of a coupling capacitor 17 and a resistor 18 the signal of the pyroelectric element 1 is led to a low pass filter 19 and further to an amplifier 20. The amplified signal is then rectified by a diode 21 and smoothed by a smoother circuit 22. Then the smoothed output is led to a control circuit 12, which has a comparison circuit 23 for comparing the input level of the smoothed DC signal with a reference level. Output of the control circuit 12, which is based on the output of the comparison circuit 23, is given to a load machine 13 to be controlled, so that, when the input to the control circuit 12 exceeds a predetermined level, an interruption switch is activated, thereby to stop the oscillation of the magnetron.

FIG. 5 shows a time chart of the input voltage to the control circuit 12 from the smoother circuit 22, wherein vertical dotted lines A show original output pulses of the pyroelectric sensor 1 and solid line curve B shows output of the smoother circuit 22. The conventional microwave oven is configurated such that the control circuit 12 stops the oscillation of the magnetron 3 when output signal level of the smoother circuit 22 exceeds the predetermined reference level 24, thereby to prevent overheating of the food stuff.

The above-mentioned conventional apparatus, however, has a problem that when a strong mechanical shock, such as one generated by closing of a door of the microwave oven, often causes the pyroelectric element 1 to generate a strong electric pulse induced by mechanical strain of the pyroelectric element, as shown in FIG. 6, wherein a pulse C corresponds to the occurrence of the door shock. Such strong electric pulse in the output will undesirably causes the control circuit to actuate the load interruption switch, and erroneously stops the oscillation of the magnetron. That is, the conventional pyroelectric sensor circuitry has a problem of erroneous operation at mechanical shocks.

OBJECT AND SUMMARY OF THE INVENTION

In order to dissolve the above-mentioned problem of maloperation as a steam detection element, the pyroelectric sensing apparatus in accordance with the present invention has an improved configuration.

The pyroelectric sensing apparatus in accordance with the present invention comprises:

a pyroelectric element which issues succession of pulses at contact by steam on its sensing face, detection means for detecting pulses of above a predetermined level by sampling with predetermined sampling timings, succession period detection means for detecting time period of the succession of pulses, and comparison means for comparing time period detected by the succession period detection means with a predetermined reference time period and issues a control output signal when the detected time period is longer than the reference time period.

The pyroelectric sensing apparatus in accordance with the present invention can make accurate and reliable signal detection because of high SN ratio, since short width noise outputs issued by mechanical shock or electric shock are prevented from producing the load-stop signal, by taking advantage of the characteristic of the pyro-electric detection signal of boiling steam having low frequency components.

Furthermore, the pyroelectric sensing apparatus of the present invention enables the accurate detection of the boiling steam, without any delaying which has been in the conventional analog circuit using the capacitor smoothing circuit. Hence a very quick generation of load-stop signal is possible owing to use of the digital circuit.

By the above-mentioned configuration, the pyroelectric sensing apparatus in accordance with the present invention issues output signal only at detection of steam, discriminating it from spurious noise due to mechanical shock impressed thereon.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 is a schematic vertical view showing configuration of a known electric oven wherein the pyro-electric sensing apparatus both of the conventional and the present invention are provided.

FIG. 2(a) and FIG. 2(b) are schematic circuit diagram for explanation of operation principle of the pyroelectric sensing element.

FIG. 3 is a frequency spectrum graph showing frequency components of electric output of a pyroelectric element at contact by boiling steam thereon.

FIG. 9 is a time chart of signals of various parts of the circuit of FIG. 7.

DESCRIPTION OF THE PREFERRED EMBODIMENT

Figure 4:
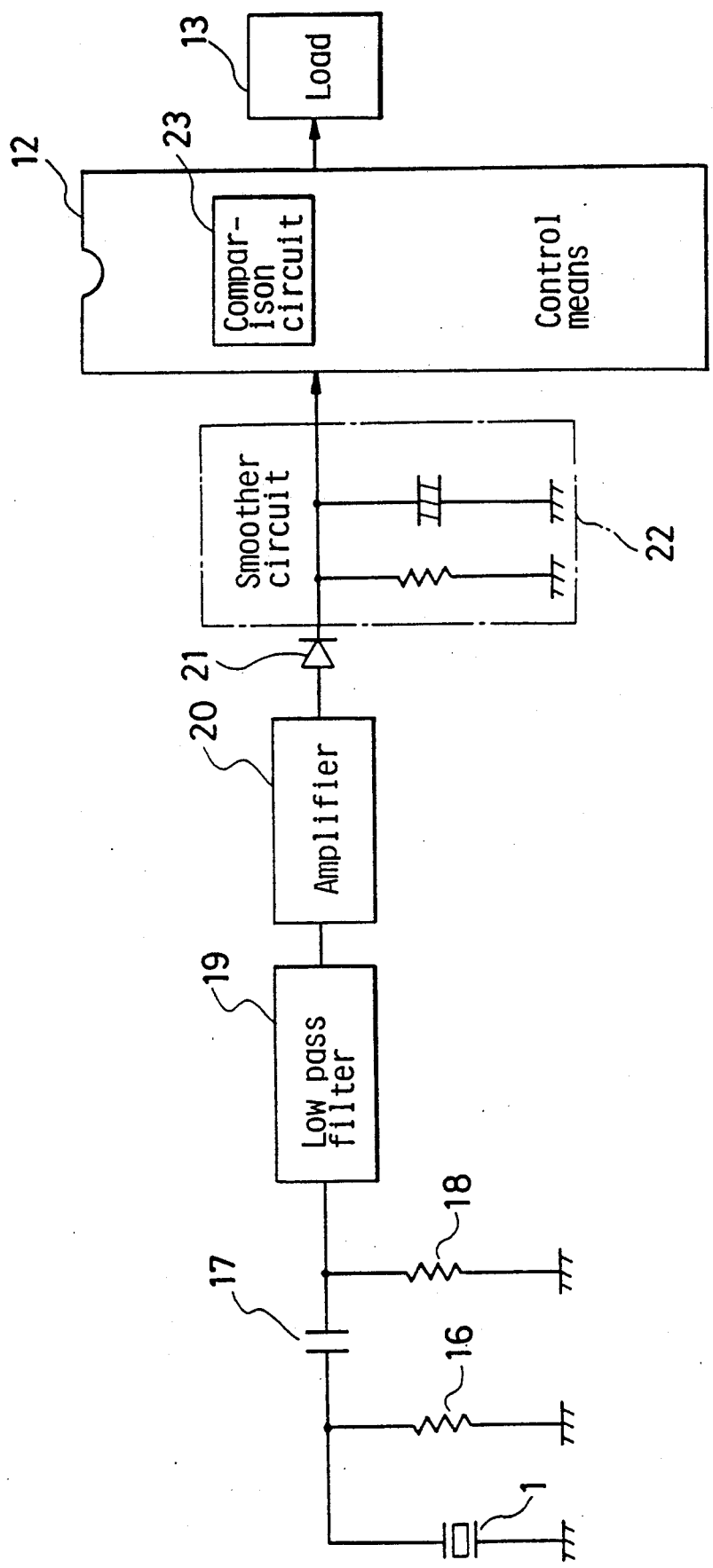
FIG. 4 is a circuit diagram of the conventional pyroelectric sensing apparatus.
Figure 5:
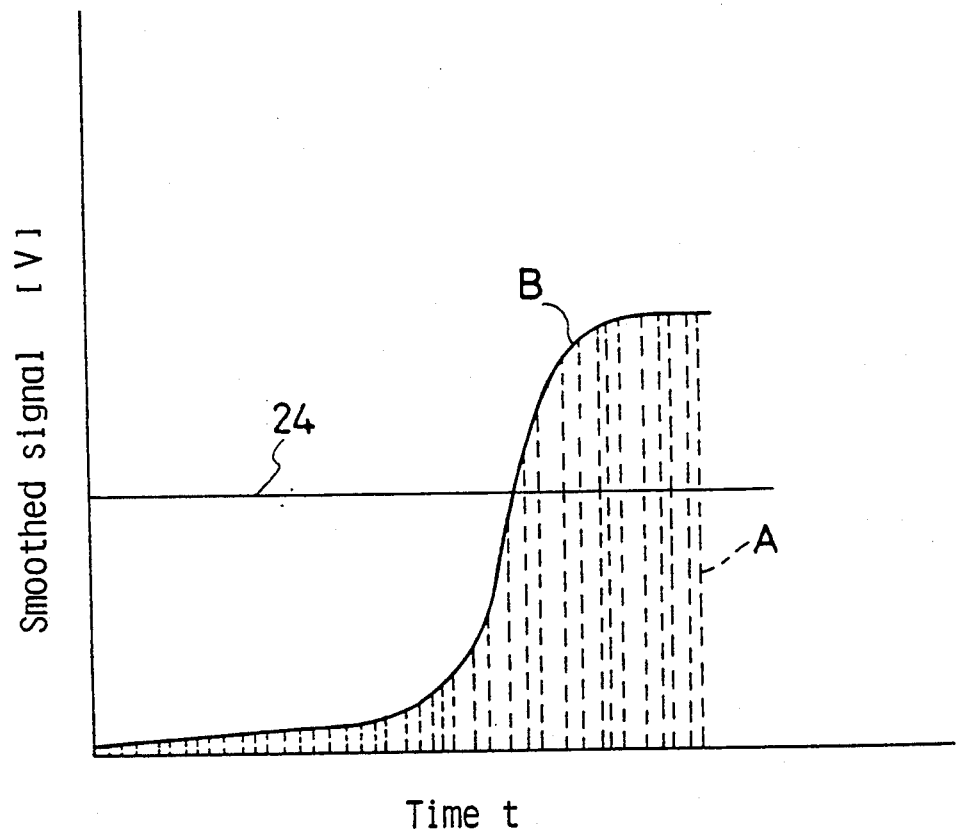
FIG. 5 is a time chart of smoothed output voltage of a pyroelectric element in ordinary operation.
Figure 6:
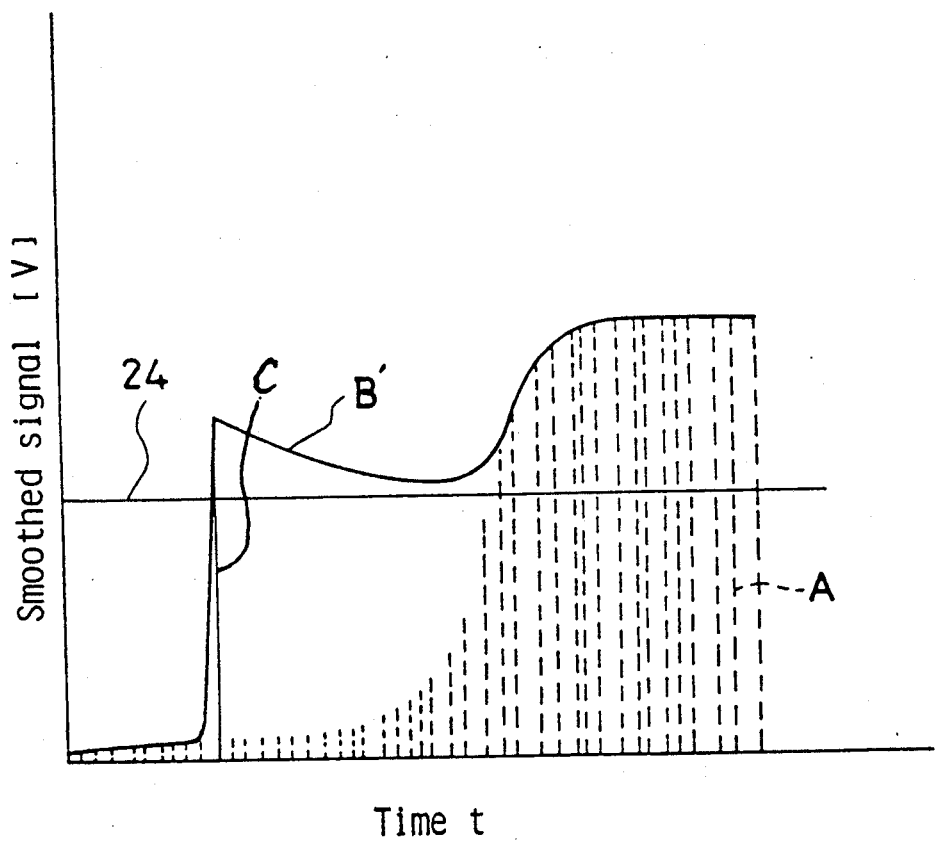
FIG. 6 is a time chart of smoothed output voltage of a pyroelectric element at impression of a mechanical shock thereon.
Figure 7:
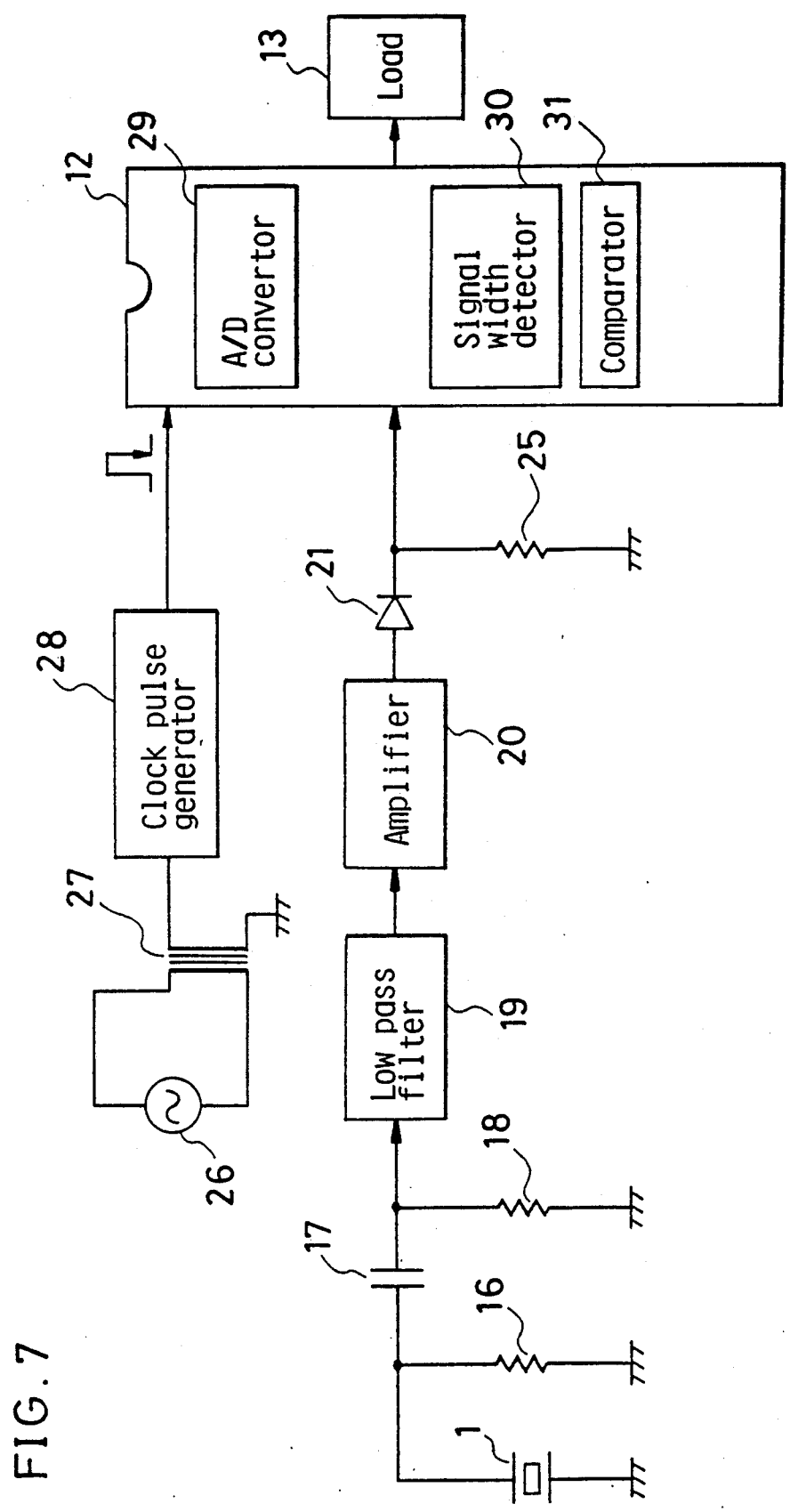
FIG. 7 is a circuit diagram of a preferred embodiment of the present invention.

A preferred embodiment of the present invention is elucidated with reference to FIG. 7 and thereafter. FIG. 7 is a circuit diagram of the preferred embodiment wherein a parallel load resistor 16 is connected across both ends of the pyroelectric sensor 1, and through a coupling circuit consisting of a coupling capacitor 17 and a resistor 18 the signal of the pyroelectric element 1 is led to a low pass filter 19 and further to an amplifier 20. The amplified output of the amplifier 20 is rectified by a diode 21 and impressed on a load resistor 25 without smoothing by a smoother circuit. Current of a commercial power source 26 is led through a transformer 27 to a clock pulse generator 28 which produces clock pulse train which is in synchronism with the commercial power source current. The control circuit 12 comprises: an A/D convertor for converting timings and levels of pulses of input signal to the control part 12 from the rectifier diode 21 into digital signals; a signal width detector 30 for detecting time period of consecutive pulses of levels above a predetermined reference level and issuing a digital output signal corresponding to the time period of consecutive comings of the pulses (width of the input pulse); and a comparator 31 which compares digital pulse width data of the signal width detector 30 with a predetermined reference width data.

Figure 8A:
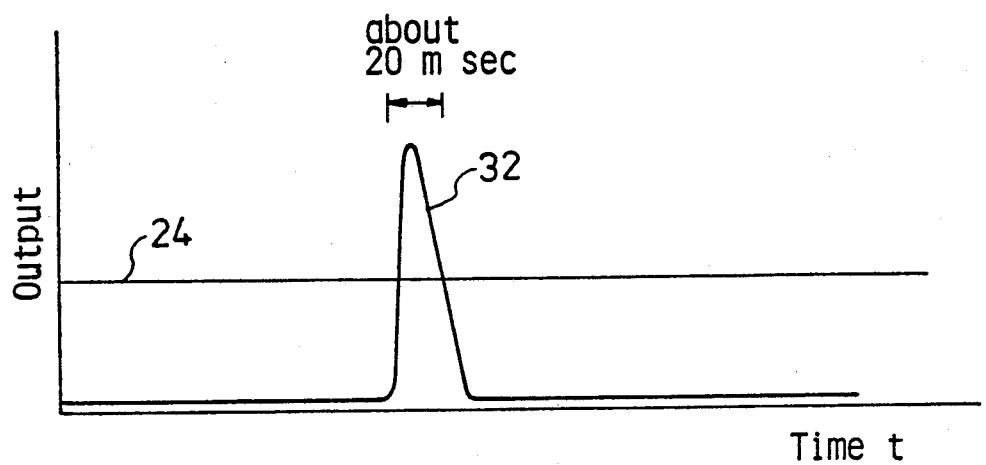
FIG. 8(a), FIG. 8(b) and FIG. 8(c) are waveforms of output of the smoothed pyroelectric elements in various states.
Figure 8B:
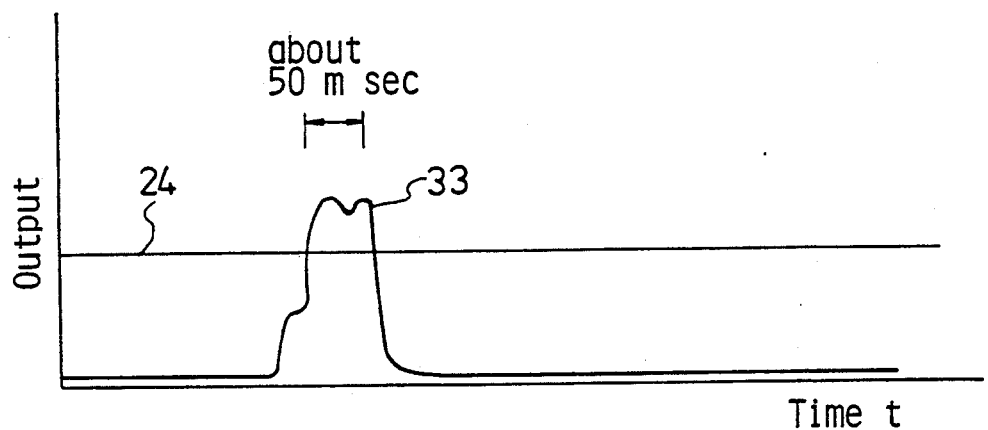
Figure 8C:
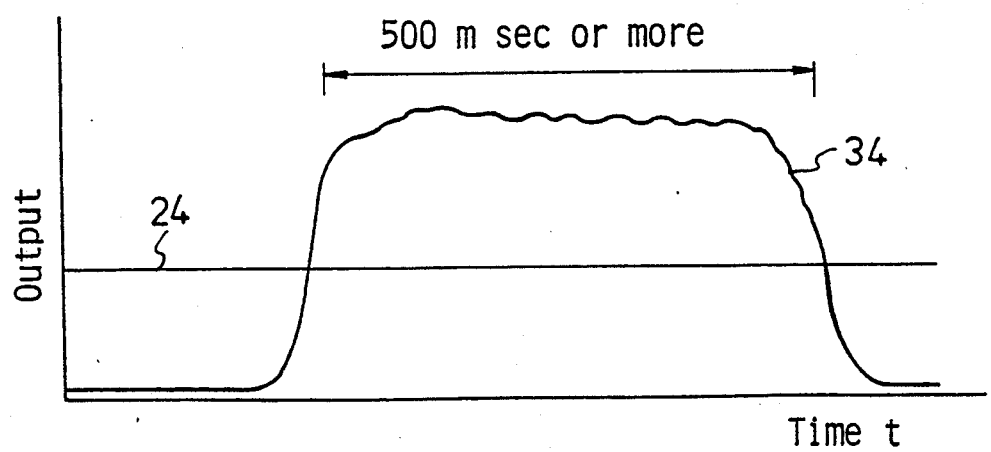

Next, principle of operation of the embodiment of FIG. 7 is elucidated with reference to time charts shown in FIG. 8(a), FIG. 8(b) and FIG. 8(c). Among the output signal of the pyroelectric element 1, there are mainly three kinds of outputs, namely an output generated by mechanical shock such as open or close of the microwave oven as shown by numeral 32 of FIG. 8(a), another output generated by pulling out an electric plug from a wall socket of the common power line with the microwave oven as shown by numeral 33 in FIG. 8(b), and still another output generated by coming of boiling steam on the sensing face of the pyroelectric sensor as shown by numeral 34 in FIG. 8(c). In FIGS. 8(a), 8(b) and 8(c) lines 24 show a reference level. By comparing these three kinds of output, it is observed that the last output generated by the boiling steam is very much different from the other two kinds of outputs in pulse width. That is the output generated by the boiling steam has a large width of about 500 m sec or longer, while the electric noise generated by the mechanical shock is only about 20 m sec width and the electric noise generated by taking off of the electric plug is about 50 m sec width.

Therefore, the above-mentioned difference of electric output is utilized in selecting the genuine signal by boiling steam and producing load controlling signal in the circuit of FIG. 7.

Figure 10:
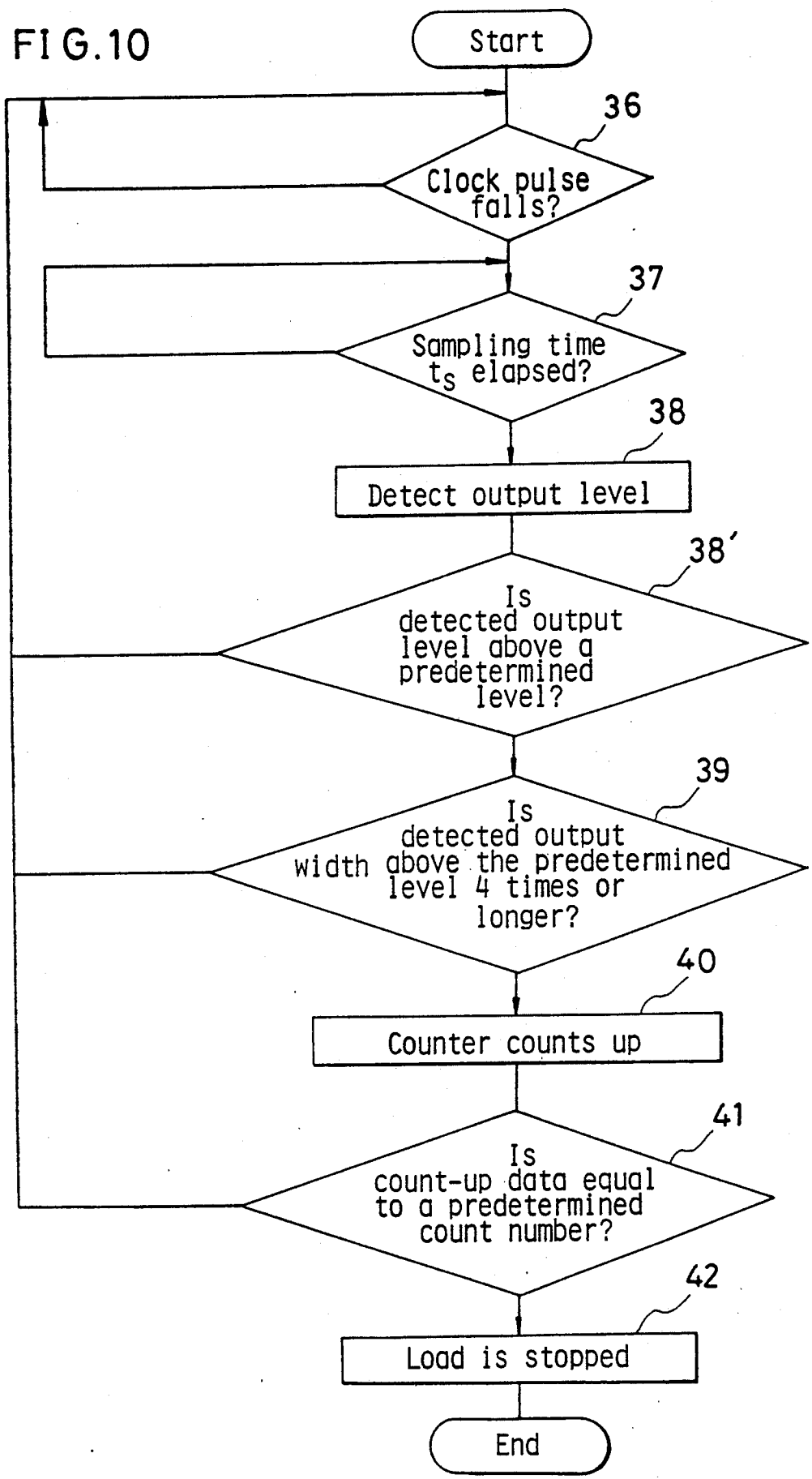
FIG. 10 is a flow chart showing algorithm of control part 12 of the circuit of FIG. 7.

The operation of the embodiment circuit of FIG. 7 is elucidated with reference to the electric waveforms shown in FIG. 9 together with a control flow chart of FIG. 10.

Output signal 34 of FIG. 8(c) from the pyroelectric element 1 is detected by the A/D convertor 29 at every sampling timing $t_s$ shown in the waveform SP of FIG. 9 by utilizing clock pulses 36 in the waveform CL of FIG. 9. And the digital-converted output from the A/D convertor 29 is checked by the signal width detector 30 in the control part 12 of FIG. 7, which examines that, when signals above a predetermined level 24 were detected four times or more of the sampling timings, gives "one count" to the comparator 31. The sampling timings $t_s$ of 37 in the waveform SP of FIG. 9 are given at every fall of the synchronization signal 36 which is produced from the commercial power source current 35 in waveform AC of FIG. 9 (Step 37). Output level of signal from the rectifier 21 to the A/D convertor is detected (Step 38). Next, the detected output level is compared with a reference level and examined whether it is above a predetermined level (38'). Thereafter, when the output level is above the predetermined level, the length or time period of continuation of the output is examined to determine whether it continues four sampling times (4 $t_s$) or longer (Step 39). And when the continuation time is four sampling times or longer, the counter in the comparator 31 of the control part 12 make counting (Step 40). And the counted value is examined whether it is equal to a predetermined count (e.g. 10 counts, which corresponds to a time period of about 500 m sec) or not (Step 41). When the counted value reaches the predetermined count, a load-stop signal is issued (Step 42). In other words, when the input signal to the control part 12 is shorter than the predetermined time period of 4 $t_s$ as shown by numerals 43 or 44 in the waveform PE of FIG. 9, the counter in the comparator 31 does not count, and hence the comparator 31 of the control part 12 does not issue the load-stop signal.

A part from the above-mentioned embodiment wherein the load-stop signal is generated when the output from the pyroelectric element continues longer than a predetermined time period e.g. four sampling times or more, other modified manner of checking the output of the pyroelectric element is possible. In such modified manner, the output signal above a predetermined level (voltage) is selected and continuation time period of the selected output which is above the reference level is examined of its continuation time period by a timer or the like.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A pyroelectric sensing apparatus comprising:
a pyroelectric element which issues a succession of pulses in response to a contact by steam on a sensing face of said pyroelectric element,
detection means for detecting pulses from said pyroelectric element that are above a predetermined level, by sampling at a predetermined sampling timing,
succession period detection means, receiving pulses from said detection means that are above said predetermined level, for detecting a time period of said pulses, and
comparison means for comparing said time period detected by said succession period detection means with a predetermined reference time period and issuing a control output signal only when said detected time period is longer than said reference time period.

2. A pyroelectric sensing apparatus comprising:
a pyroelectric element which issues a succession of pulses in response to a contact by steam on a sensing face of said pyroelectric element,
filter means, coupled to said pyroelectric element, for filtering a selected mode of said succession of pulses to produce filtered pulses,
detection means, coupled to said filter means, for detecting a level of said filtered pulses by sampling with a predetermined sampling timing,
succession period detection means for detecting a time period of said succession of pulses when said level of said filtered pulses are above a predetermined level, and
comparison means for comparing said time period detected by said succession period detection means with a predetermined reference time period and issuing a control output signal only when said detected time period is longer than said reference time period.

3. A pyroelectric sensing apparatus in accordance with claim 1 or 2, wherein
said predetermined sampling time is defined by a plurality of clock pulses produced from an AC current of a commercial power source.

4. A pyroelectric sensing apparatus in accordance with claim 1 or 2, wherein
said predetermined reference time period is substantially 500 m sec.

* * * * *